(12) United States Patent
Lin (10) Patent No.: US 6,193,323 B1
(45) Date of Patent: Feb. 27, 2001

(54) HIDDEN TYPE QUICK-RELEASE WHEEL HUB ASSEMBLY WITH REINFORCING ARRANGEMENT

(76) Inventor: Hui-Liang Lin, No. 408, Sec. 3, Deng-Shan Road, Tzuen-Liau Village, Shi-Jou Shiang, Chang-Hua Hsien (TW)

(*) Notice: Subject to any disclaimer, the term of this patent is extended or adjusted under 35 U.S.C. 154(b) by 0 days.

(21) Appl. No.: 09/357,998

(22) Filed: Jul. 21, 1999

(51) Int. Cl.⁷ .............................. B60B 27/00; F16C 13/00
(52) U.S. Cl. ........................................ 301/110.5; 384/545
(58) Field of Search ................................. 301/105.1, 106, 301/108.1, 108.3, 110.5, 110.6, 130, 124.2; 384/626, 545

(56) References Cited

U.S. PATENT DOCUMENTS

| | | | |
|---|---|---|---|
| 1,150,728 | * 8/1915 | Austin et al. | 301/535 |
| 1,480,565 | * 1/1924 | Mottlau | 301/110.5 |
| 1,670,890 | * 5/1928 | Illmer | 411/105.1 |
| 2,622,934 | * 12/1952 | Phelps | 301/110.5 |
| 2,709,116 | * 5/1955 | Heth | 301/124.2 |
| 3,362,737 | * 1/1968 | Cobb | 411/534 |
| 3,893,708 | * 7/1975 | Moroney | 301/105.1 |
| 4,121,871 | * 10/1978 | Adams, Jr. | 301/105.1 |
| 4,810,039 | * 3/1989 | Trema | 301/124.2 |
| 4,880,280 | * 11/1989 | Panzica et al. | 301/105.1 |
| 5,601,342 | * 2/1997 | Perner | 301/5.3 |
| 5,823,555 | * 10/1998 | Ashman | 301/124.2 |
| 5,853,227 | * 12/1998 | Schmidt, III | 301/5.7 |
| 5,909,931 | * 6/1999 | Tabe | 301/110.5 |

* cited by examiner

Primary Examiner—S. Joseph Morano
Assistant Examiner—Long Bao Nguyen
(74) Attorney, Agent, or Firm—Rosenberg, Klein & Lee (57) ABSTRACT

A quick-release wheel hub assembly includes a hub with an axial hole. The hub further includes a compartment defined in each of two ends thereof, each end of the hub further including a shoulder. Two bearings are mounted in the compartments, respectively. Each bearing has an end that bears against the shoulder of an associated end. A shaft is extended through the axial hole of the hub and the bearings. A sleeve is mounted around the shaft and positioned between the bearings. The sleeve may reliably prevent disengagement of the hub from the shaft. In addition, the strength of the shaft is improved. If the distance between the bearings is larger than the length of the sleeve, a resilient retaining washer may be mounted between the sleeve and one of the bearings.

1 Claim, 8 Drawing Sheets

HIDDEN TYPE QUICK-RELEASE WHEEL HUB ASSEMBLY WITH REINFORCING ARRANGEMENT

BACKGROUND OF THE INVENTION

1. Field of the Invention

The present invention relates to an improved hidden type quick-release wheel hub assembly, and more particularly to a hidden type quick-release wheel hub assembly with a reinforcing arrangement to reinforce the structure.

2. Description of the Related Art

Figure 7:
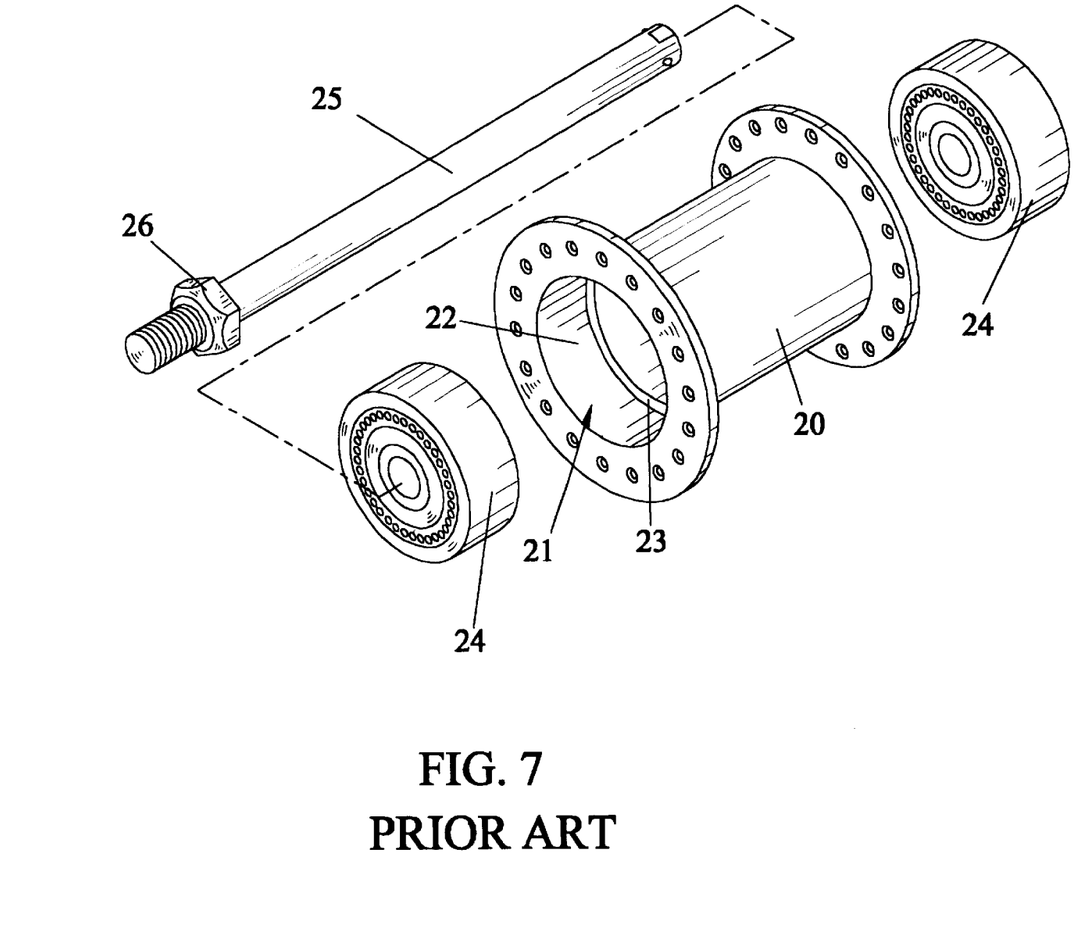
FIG. 7 is an exploded perspective view of a conventional quick-release wheel hub assembly.
Figure 8:
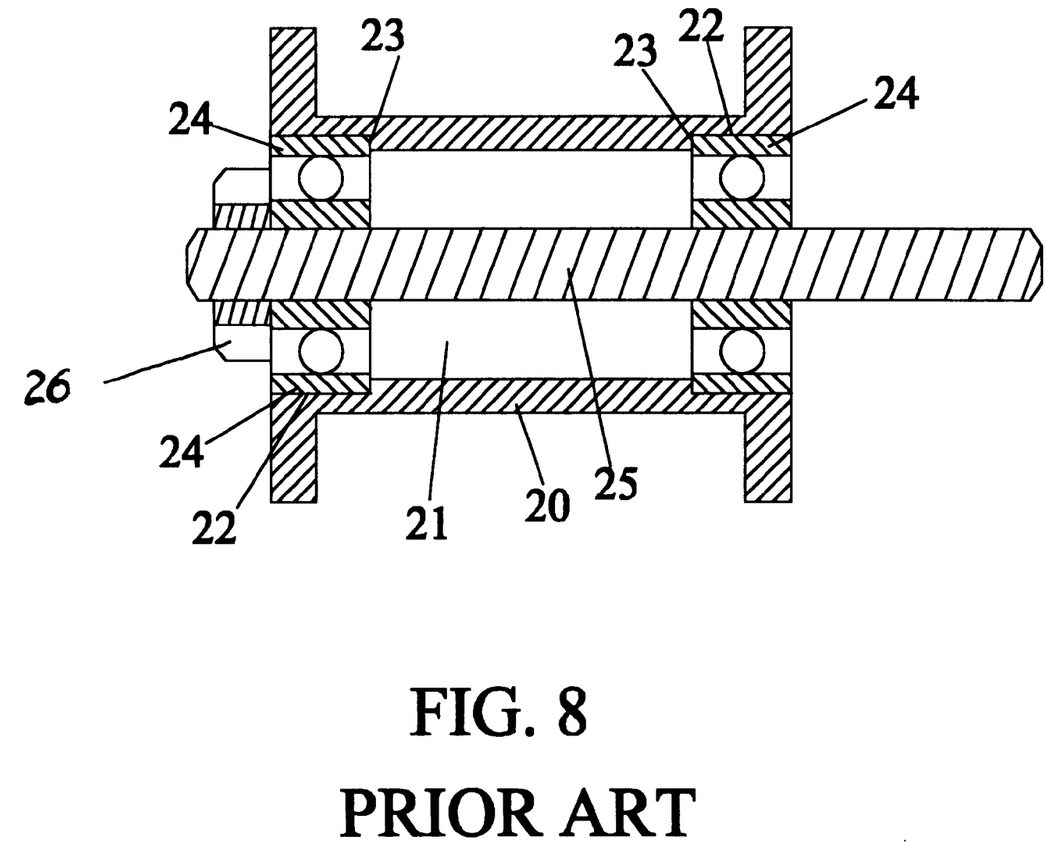
FIG. 8 is a sectional view of the conventional quick-release wheel hub assembly.

FIG. 7 of the drawings illustrates a typical quick-release wheel hub assembly that includes a hub 20 with an axial hole 21, each end of the hub 20 including a compartment 22 and a shoulder 23, two bearings 24 respectively received in the compartments 22 and respectively bearing against the shoulders 23, and a shaft 25 extended through the bearings 24 and the axial hole 21 of the hub 20. A nut 26 is threadedly engaged with an end of the shaft 25. FIG. 8 illustrates a sectional view of the quick-release wheel hub assembly. It is, however, found that the shaft 25, as having a smooth peripheral surface, may be moved longitudinally relative to the bearings 24 when it is subjected to a relatively larger force or it rotates at high speed. This results in an unstable structure. Namely, the hub 20 might be disengaged from the shaft 25 and thus endangers the cyclist. In addition, the shaft 25 is generally tubular for installation of the quick-release and thus adversely affects its strength. Namely, the shaft 25 tends to bend when subjected to a larger force. The present invention is intended to provide an improved quick-release wheel hub assembly to solve these problems.

SUMMARY OF THE INVENTION

A quick-release wheel hub assembly in accordance with the present invention comprises a hub with an axial hole. The hub further includes a compartment defined in each of two ends thereof, each end of the hub further including a shoulder. Two bearings are mounted in the compartments, respectively. Each bearing has an end that bears against the shoulder of an associated end. A shaft is extended through the axial hole of the hub and the bearings. A sleeve is mounted around the shaft and positioned between the bearings. The sleeve may reliably prevent disengagement of the hub from the shaft. In addition, the strength of the shaft is improved.

If the distance between the bearings is larger than the length of the sleeve, a resilient retaining washer may be mounted between the sleeve and one of the bearings. The retaining washer includes a plurality of inwardly extending resilient teeth.

Other objects, advantages, and novel features of the invention will become more apparent from the following detailed description when taken in conjunction with the accompanying drawings.

DETAILED DESCRIPTION OF THE PREFERRED EMBODIMENT

Figure 1:
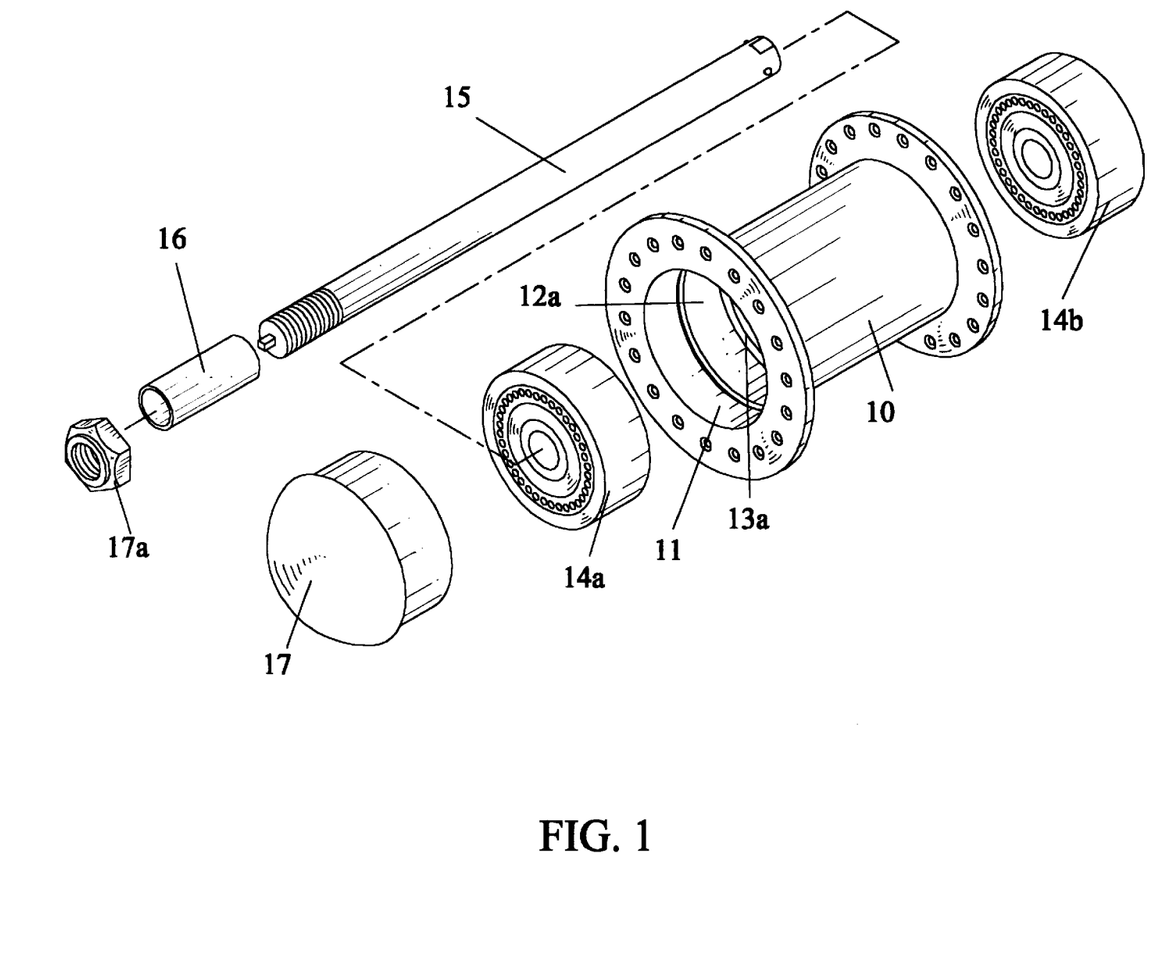
FIG. 1 is an exploded perspective view of a quick-release wheel hub assembly in accordance with the present invention.
Figure 2:
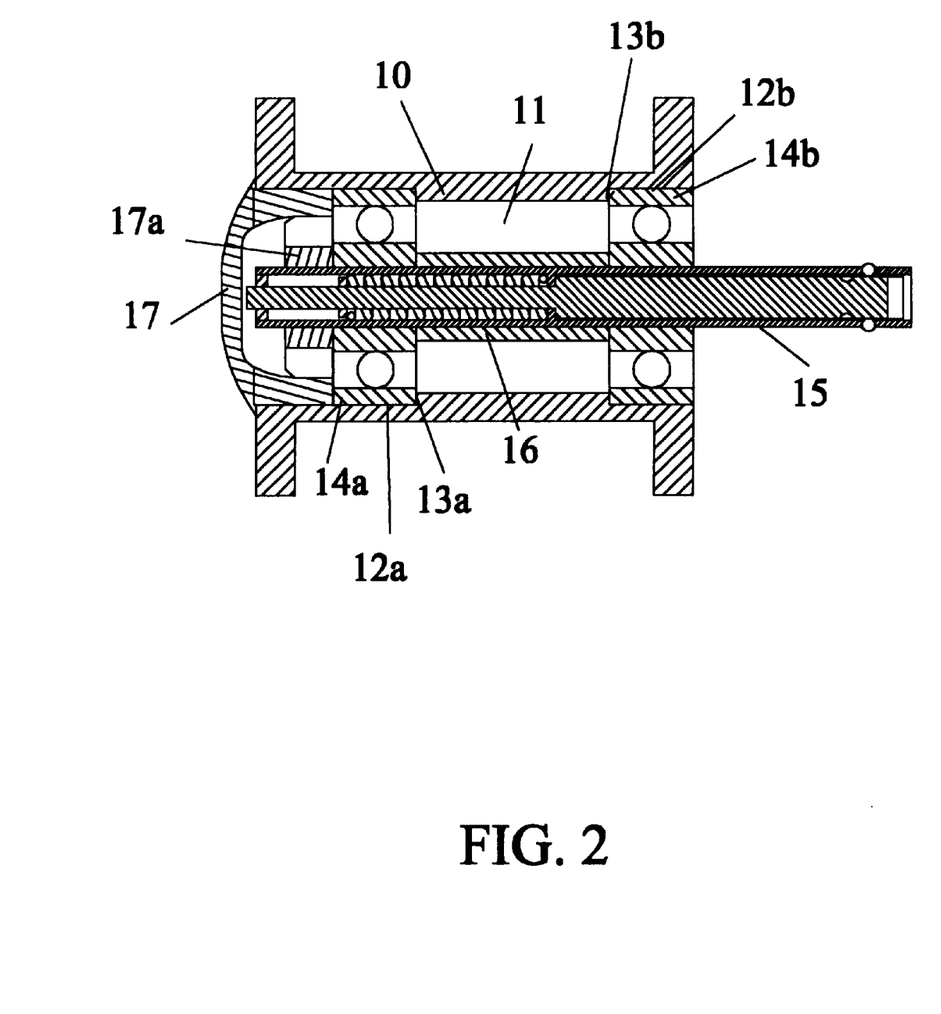
FIG. 2 is a longitudinal sectional view of the quick-release wheel hub assembly in accordance with the present invention.
Figure 3:
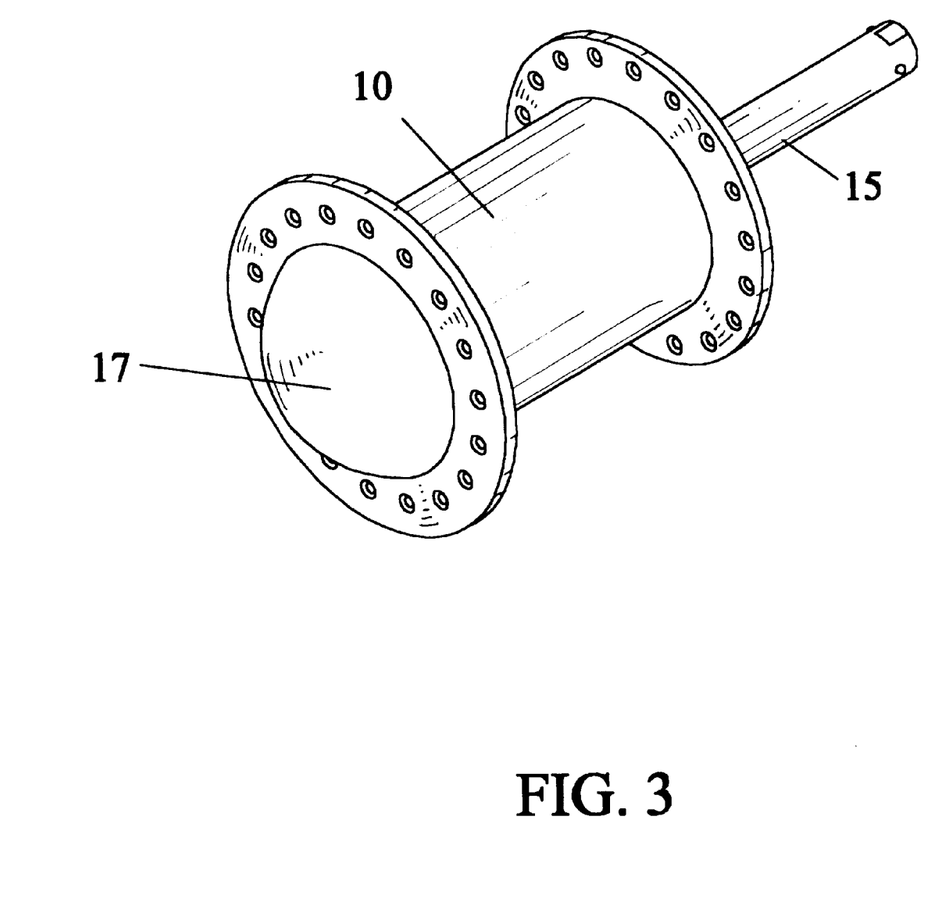
FIG. 3 is a perspective view of the quick-release wheel hub assembly in accordance with the present invention.

Referring to FIGS. 1 through 6 and initially to FIGS. 1 through 3, a hidden type quick-release wheel hub assembly in accordance with the present invention generally includes a hub 10 having an axial hole 11 and a shaft 15 extended through the axial hole 11. Each end of the hub 10 includes a compartment 12a, 12b (FIG. 2) for receiving a bearing 14a, 14b. Each end of the hub 10 further includes a shoulder 13a, 13b (FIG. 2) against which an associated bearing 14a, 14b bears. The shaft 15 includes a sleeve 16 mounted therearound and located between the bearings 14a and 14b for reinforcing the shaft 15 and preventing disengagement of the hub 10 from the shaft 15. The hub 10 further includes a nut 17a threadedly engaged on an end thereof.

In assembly, referring to FIGS. 2 and 3, the sleeve 16 is mounted around the shaft 15 and secured to the shaft 15 by soldering. The bearing 14a is mounted in the compartment 12a in the axial hole 11 of the hub 10. The other bearing 14b is then mounted around the shaft 15 and bears against an end of the sleeve 16. Next, the shaft 15 is extended through the axial hole 11 of the hub 10 and the bearing 14a in the hub 10 such that the bearing 14a is around the shaft 15 and bears against the other end of the sleeve 16 while retaining the bearing 14b in the compartment 12b in the hub 10. After attaching the nut 17a to an end of the shaft 15, an anti-dust cap 17 is attached to cover an end of the axial hole 11 of the hub 10 adjacent to the nut 17a.

Figure 4:
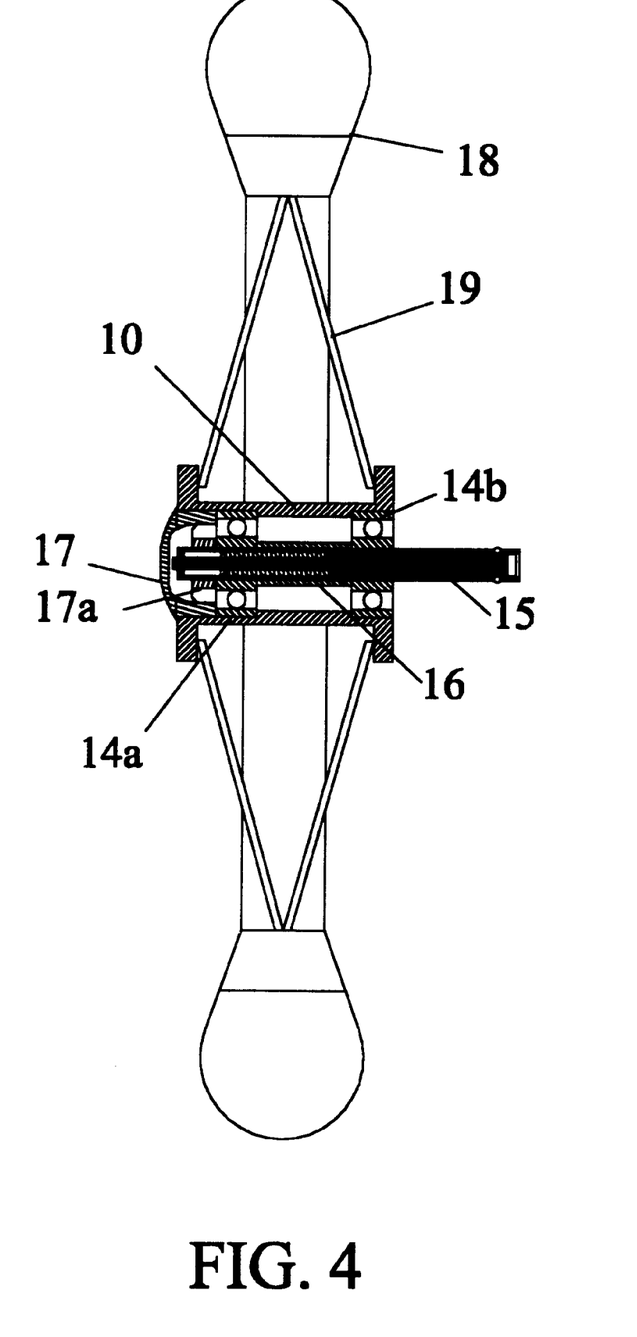
FIG. 4 is a schematic top view, partially sectioned, illustrating engagement of the quick-release wheel hub assembly in accordance with the present invention and a wheel rim.

Referring to FIGS. 2 and 4, when in use, the hub 10 can be connected to an end of each of a multiplicity of spokes 19, the other end of each spoke 19 is connected to a wheel rim 18.

Figure 5:
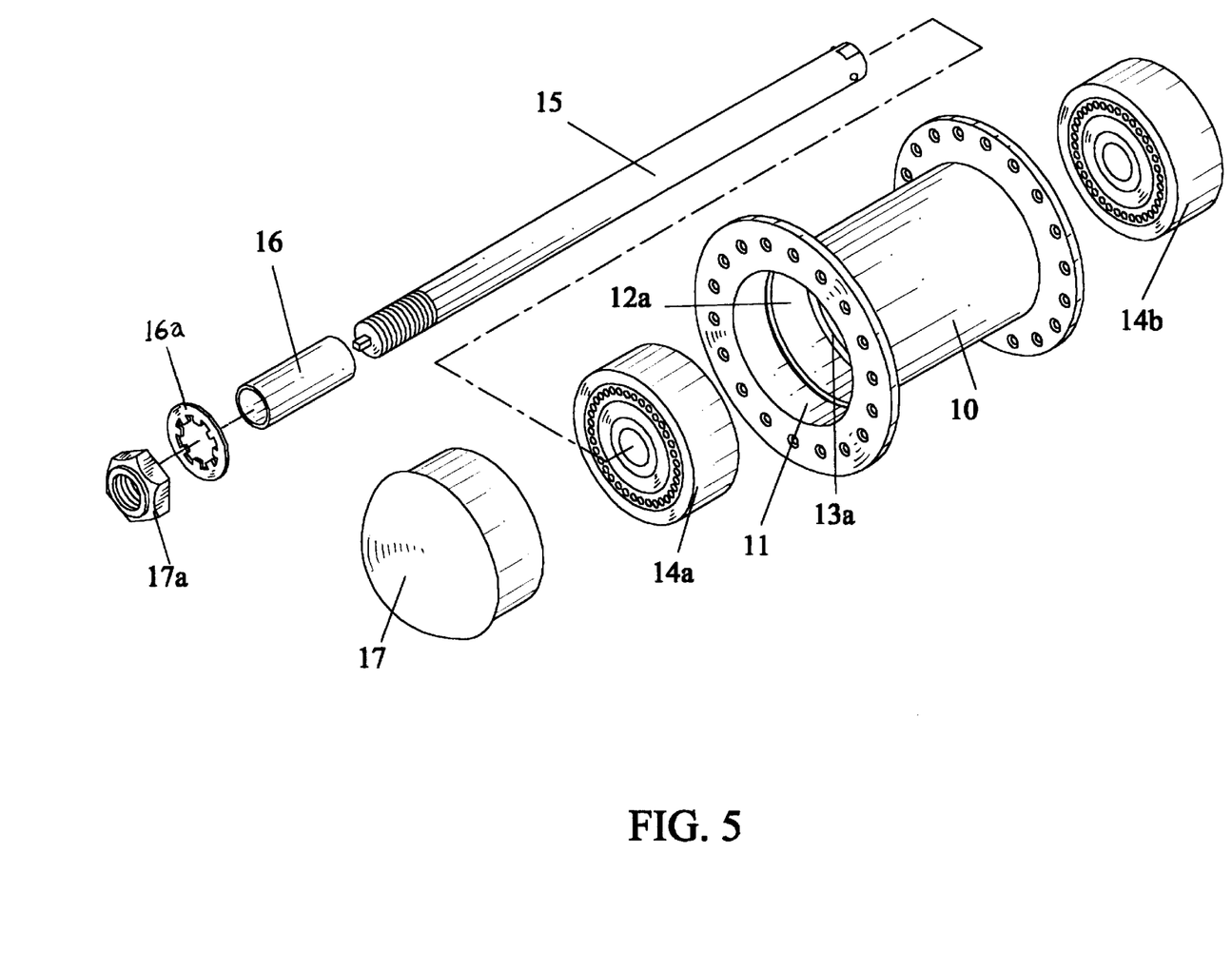
FIG. 5 is an exploded perspective view of another embodiment of the quick-release wheel hub assembly in accordance with the present invention.
Figure 6:
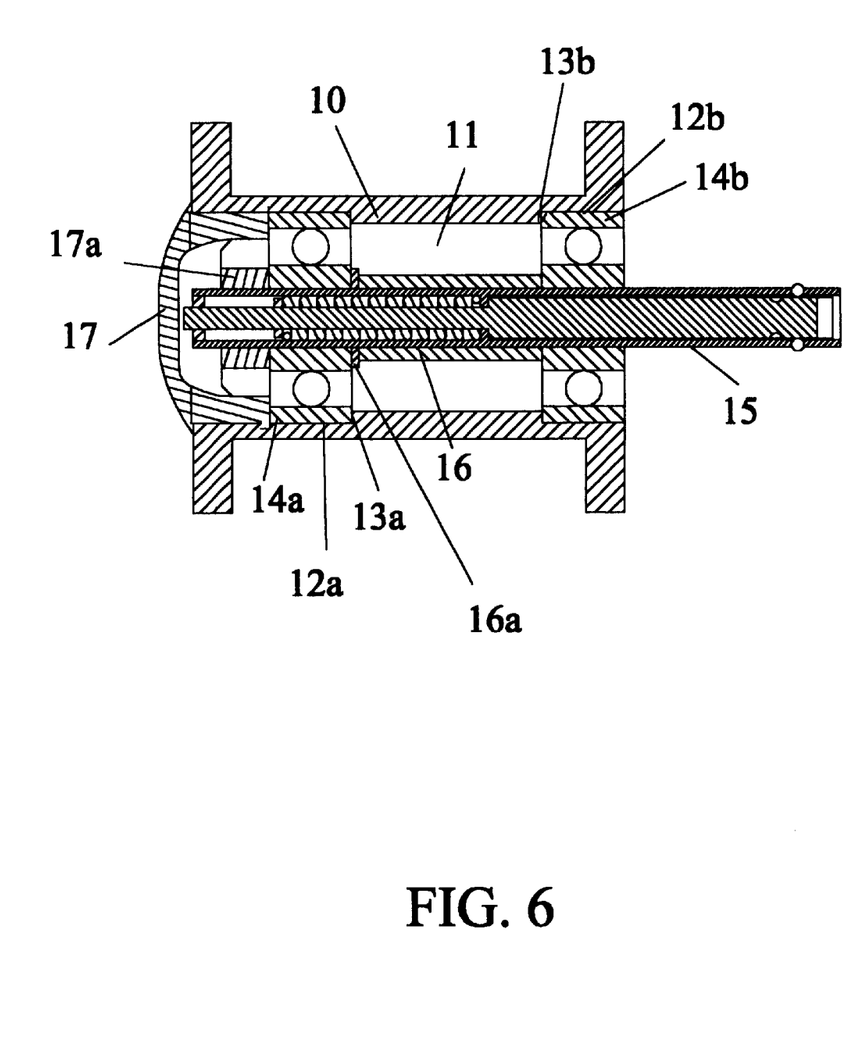
FIG. 6 is a longitudinal sectional view of the quick-release wheel hub assembly in FIG. 5.

Referring to FIGS. 5 and 6, in some cases the distance between the bearings 14a and 14b is larger than the length of the sleeve 16, a resilient retaining washer 16a may be mounted around the shaft 15 and between one of the bearings (e.g., bearing 14a) and the sleeve 16, thereby preventing sliding movement of the sleeve 16. The washer 16a includes a number of inwardly extending teeth (not labeled) that has proper resiliency to allow the washer 16a to slide along the shaft 15 until the washer 16a is positioned between bearing 14a and the sleeve 16.

Accordingly to the above description, it is appreciated that the sleeve 16 may reliably prevent disengagement of the hub 10 from the shaft 15. In addition, the strength of the shaft 15 is improved.

Although the invention has been explained in relation to its preferred embodiment, it is to be understood that many other possible modifications and variations can be made without departing from the spirit and scope of the invention as hereinafter claimed.

What is claimed is:

1. A quick-release wheel hub assembly comprising:

a hub including an axial hole, the hub including a compartment defined in each of two ends thereof, each said end of the hub further including a shoulder;

two bearings mounted in the compartments, respectively, each said bearing having an end that bears against the shoulder of an associated said end;

a shaft extended through the axial hole of the hub and the bearings;

a sleeve mounted around the shaft and positioned between the bearings; and a retaining washer secured on the shaft and positioned between the sleeve and one of the two bearings the retaining washer including a plurality of inwardly extending resilient teeth engaged on a periphery of the shaft so that the retaining washer is securely positioned on the shaft.

* * * * *